United States Patent [19]

Kistler

[11] Patent Number: 5,667,167

[45] Date of Patent: Sep. 16, 1997

[54] METHODS AND APPARATUS FOR REUSABLE LAUNCH PLATFORM AND REUSABLE SPACECRAFT

[75] Inventor: Walter Paul Kistler, Redmond, Wash.

[73] Assignee: Kistler Aerospace Corporation, Kirkland, Wash.

[21] Appl. No.: 299,089

[22] Filed: Sep. 2, 1994

[51] Int. Cl.$^6$ .................. B64F 5/00; B64F 1/00
[52] U.S. Cl. .................. 244/110 E; 244/158 R; 244/63; 244/114 R
[58] Field of Search .................. 244/158 R, 110 E, 244/114, 107, 115, 63

[56] References Cited

U.S. PATENT DOCUMENTS

| | | | |
|---|---|---|---|
| 1,637,769 | 8/1927 | Ennisson | 244/114 R |
| 1,739,193 | 12/1929 | Ward | 244/114 R |
| 1,874,423 | 8/1932 | Belleville | 244/110 E |
| 1,914,573 | 6/1933 | Kookogey | 244/114 R |
| 2,841,107 | 7/1958 | Scheider | 244/110 E |
| 3,000,593 | 9/1961 | Eggers et al. | 244/2 |
| 3,285,175 | 11/1966 | Keenan . | |
| 3,486,718 | 12/1969 | Marchal et al. . | |
| 3,817,479 | 6/1974 | Crowley | 244/17.11 |
| 4,265,416 | 5/1981 | Jackson et al. | 244/2 |
| 4,678,141 | 7/1987 | Sarrantonio | 244/2 |
| 4,709,883 | 12/1987 | Giuliani et al. | 244/63 |
| 4,744,529 | 5/1988 | Clarke | 244/110 E |
| 4,802,639 | 2/1989 | Hardy et al. | 244/2.1 |
| 5,000,398 | 3/1991 | Rashev | 244/2 |
| 5,090,642 | 2/1992 | Salkeld | 244/158 |
| 5,129,602 | 7/1992 | Leonard | 244/172 |
| 5,295,642 | 3/1994 | Palmer | 244/2 |

FOREIGN PATENT DOCUMENTS 584132 1/1945 United Kingdom .................. 244/114

OTHER PUBLICATIONS

Correspondence of P. Steinnon to W. Kistler, 1 page, dated Aug. 7, 1994.
Stiennon, "Two Stage Launch Vehicle and Launch Trajectory Method," 18 pages, Aug. 7, 1994.
Dornheim, "DC–X Proving Initial Operational Concepts," Aviation Week & Space Technology, pp. 46–49, Oct. 11, 1993.
Smiljanic et al., "Delta Clipper: Design for Supportability," Aerospace America, pp. 24–27, Jul. 1993.
Worden et al., "Single Stage Rocket Technology: Here Today," Aerospace America, pp. 20–23, Jul. 1993.
Tinsley, "Auxiliary Fleet," Final Frontier, pp. 56–61.
Sellards, "The DC–X Makes Its First Test Hops," Countdown, pp. 10–11, Oct., 1993.

(List continued on next page.)

Primary Examiner—Andres Kashnikow
Assistant Examiner—Virna Lissi Mojica
Attorney, Agent, or Firm—Finnegan, Henderson, Farabow, Garrett & Dunner, L.L.P.

[57] ABSTRACT

A reusable single-stage-to-orbit spacecraft and a reusable launch assist platform provide a new system for space transportation. The platform has a frame with a cradle for supporting the spacecraft. Rocket engines attached to the launch assist platform propel the launch assist platform and the spacecraft substantially vertically through the atmosphere for release of the spacecraft. The launch assist platform returns to a predetermined landing site in a power-controlled, vertical descent.

The spacecraft is in the shape of a cone having a large, rounded base with a primary load-bearing structure substantially perpendicular to the base. The spacecraft reenters the atmosphere in a base-first reentry, and is slowed and guided to a landing site by using a rocket engine in the base. The spacecraft lands base first on a resilient landing device.

3 Claims, 17 Drawing Sheets

OTHER PUBLICATIONS

McDonnel Douglas/U.S. Army, "A New Kind of Ride," p. 32.

Cunningham, "Sabotaging SSRT's Future," Space News, vol. 4, No. 41, Oct. 18–24, 1993.

Hudson, "Phoenix: A Commercial, Reusable Single-Stage Launch Vehicle," Pacific American Launch Systems, Inc., pp. 1–13.

Bruckner et al., "Antares: A Low Cost Modular Launch Vehicle Concept," International Astronautical Federation, Aug. 28–Sep. 5, 1992, pp. 1–13.

Ruppe "Design Considerations for Future Space Launchers," Acia Astronautica, vol. 29, No. 9, pp. 705–722, 1993.

Copper et al., "Future Single–Stage Rockets: Reusable and Reliable," Aerospace America, pp. 18–21, Feb. 1994.

Bekey "Why SSTO Rockets Are Now Feasible and Practical," A White Paper, pp. 1–22, Nov. 21, 1993.

Aldrich, "NASA's Access To Space Study," pp. 1–12, Nov. 21, 1993.

Martin, "Selecting Hydrocarbon Rocket Propulsion Technology," International Astronautical Federation, pp. 1–13, Oct. 4–11, 1986.

Koelle et al., "The Single–Stage Reusable Ballistic Launcher Concept For Economic Cargo," International Astronautical Federation, Oct. 4–11, 1986.

Staehle et al., "Crew Transportation for the 1990's: Commercializing Manned Flight with Today's Propulsion," World Space Foundation 1989.

Hunter, "SSX Spaceship, Experimental," Mar. 15, 1988, updated Mar. 11, 1989.

Penn, "Advanced Booster Engine Propulsion," International Astronautical Federation, Oct. 10–17, 1987.

Hunter, "The SpaceGuild Plan," SpaceGuild, pp. i–B–5, May 30, 1991.

Gaubatz, "Space is a Place," McDonnell Douglas Aerospace, pp. 1–14.

Höeser, "The Impact of Low Cost Space Access," Feb. 1986 Updated Oct. 1989.

Koelle, "Cost Analysis of Single–Stage (SSTO) Reusable Ballistic Launch Vehicles," International Astronautical Federation, pp. 1–7, Aug. 28–Sep. 5, 1992.

Rogers et al., "What The United States Must Do To Realize The Economic Promise of Space," pp. i–35, IEEE–USA, Dec. 17, 1993.

Hunter, "SpaceGuild Related Activities," SpaceGuild, pp. 1–6.

Beichel et al., "The Next Generation Rocket Engines," International Astronautical Federation, Oct. 8–15, 1988.

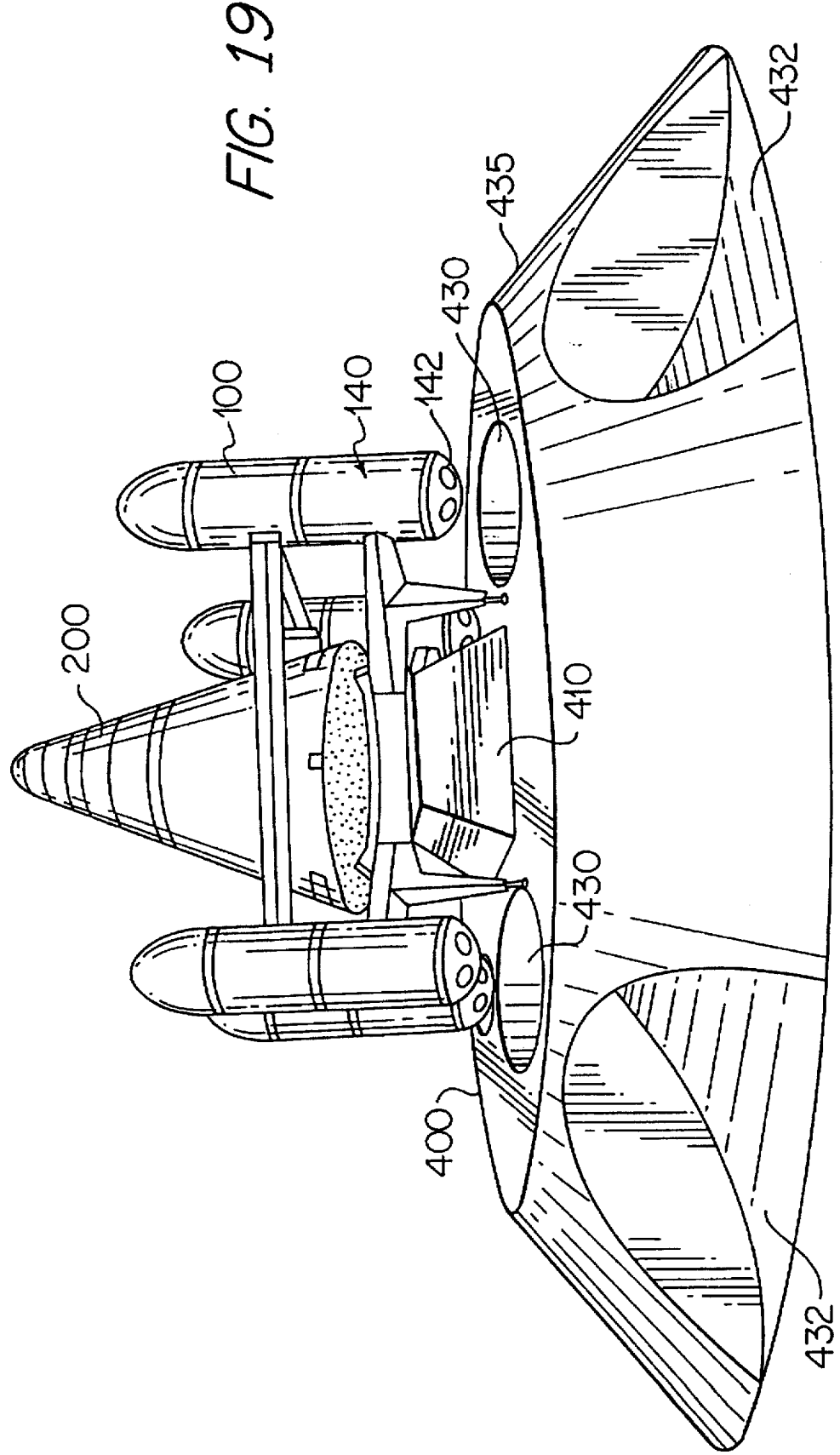

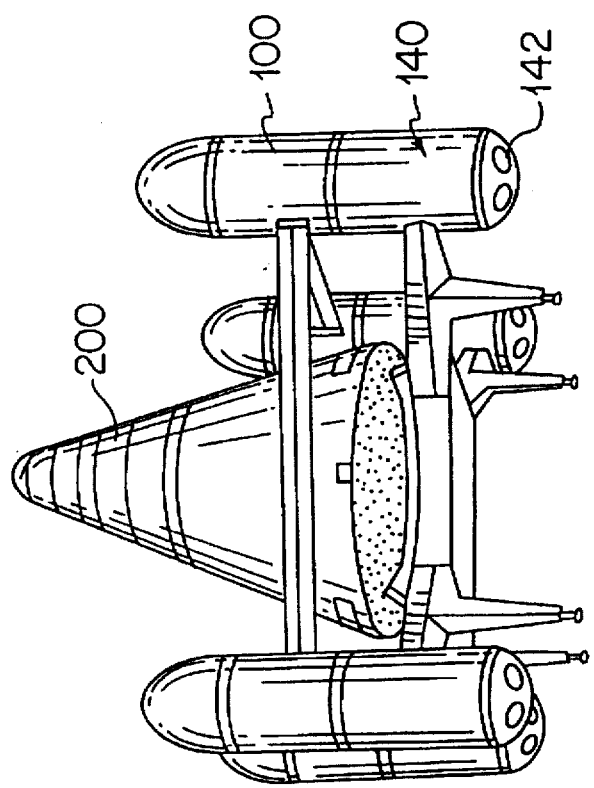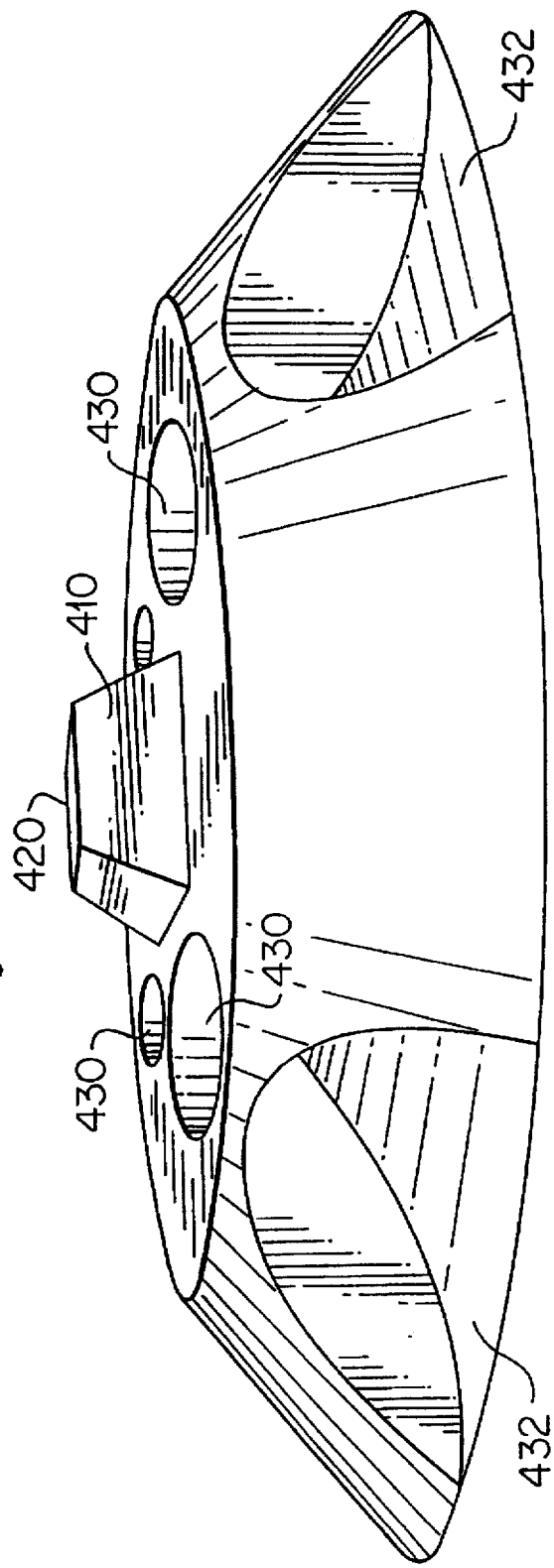
FIG. 20

METHODS AND APPARATUS FOR REUSABLE LAUNCH PLATFORM AND REUSABLE SPACECRAFT

BACKGROUND OF THE INVENTION

The present invention relates generally to launch vehicles and to spacecraft and, more particularly, to a reusable single-stage-to-orbit spacecraft and a reusable launch assist platform.

There is a considerable and increasing need for some type of transportation system to launch satellites into space for various purposes, such as communications, weather forecasting, earth sensing, and microgravity research. Currently, space transportation uses multistage rockets that successively discard their lower stages. Only the last stage reaches space and, if unmanned, becomes space debris or disintegrates when reentering the atmosphere.

One purpose of the space shuttle system was to avoid wasting all these stages with a reusable spacecraft and partially reusable rockets. Unfortunately, the shuttle has hardly met its goal of reducing waste. First, the shuttle uses solid propellant booster rockets and a large expensive fuel tank for a takeoff. The large tank is never reused, and the booster rockets are only reused after extensive refurbishing. NASA reuses the last stage of the shuttle, called the orbiter, but orbiters can only be reused after extensive refurbishment. The loss of hardware and the cost of refurbishment is one reason the shuttle has not achieved its promise to make space accessible.

The cost of space transportation by any means is enormous. A common cost figure is six to ten thousand dollars to lift every pound to orbit. This means that one conventional rocket launch may cost over one hundred million dollars, and one space shuttle trip costs more than five hundred million dollars. These exorbitant costs are due in part to the use and ultimate loss of many stages including the last stage.

To overcome the disadvantages and expense of current space systems, many scientists propose reusable, single-stage-to-orbit (SSTO) rocket vehicles. Despite some studies on SSTO designs, and papers describing different design approaches, most experts doubt whether the concept is feasible with available technologies. Although efforts in this area have spanned more than a decade, no SSTO has yet reached orbit. The reason for this is the extreme mass fraction required to achieve orbit.

The mass fraction, which is the ratio of fuel to total weight required at lift-off, is determined by the basic rocket equation, $m=m_o e^{v/c}$, where m is the mass reaching orbit, $m_o$ is the mass at lift-off, v is the theoretical velocity gain required for orbit, and c is the exhaust velocity of the rocket engine.

The theoretical velocity to reach orbit is 9 to 10 km per second, depending on the size of the vehicle and its aerodynamic losses. Given conventional launch techniques, this forces the end mass reaching orbit to be only about 10% of the lift-off mass.

Designing and building a space vehicle to carry not only useful payload, but also fuel weighing ten times the weight of the payload and space vehicle, including some safety margin, is difficult enough. Adding the requirement that the vehicle return to earth and not disintegrate from the reentry heat makes the design task nearly impossible with today's technology. Most space science experts believe that this task requires further advances in materials and rocket engines.

Government research efforts have funded the DC-X Program and several preliminary launches of a test vehicle in the New Mexico desert. The DC-X Program has witnessed takeoff and landing of a reusable vehicle, as reported in Aviation Week & Space Technology, pp. 46–49, (Oct. 11, 1993). The DC-X, however, only flew about 100 feet above ground before returning to the ground under the power of its liquid oxygen/hydrogen rocket engines.

Another proposed SSTO craft under development, the Delta Clipper, has a slender conical design. The Delta Clipper is designed to reenter the earth's atmosphere nose-first, and ultimately land in a vertical, nose-up position. There are, however, no conventional engines with the thrust to launch and return the Delta Clipper.

Both of these designs confront the same problems. Any space vehicle expends an inordinate amount of fuel (between 30 and 50% depending on vehicle size and trajectory) in the early part of the trajectory just to fight earth's gravity and air resistance. These two factors combine to make space transportation very difficult.

Providing for reentry adds yet another problem. Sleek, economical vehicle designs may reduce drag on launch, but they are ill-suited for reentry. On the other hand, an SSTO using a large, blunt base for atmospheric reentry (similar to the Mercury, Gemini, and Apollo capsules) causes severe air drag losses during ascent through the atmosphere.

To solve these problems, some scientists have proposed different types of launch systems. Many systems use airplanes specially designed to bring space vehicles aloft. This approach has several drawbacks. Because airplanes cannot fly above the atmosphere, any SSTO launched from airplanes would still need to traverse a substantial amount of atmosphere before reaching space.

Furthermore, an airplane must travel at some minimum horizontal airspeed to obtain lift from its wings. This speed, however, provides little help to launch an SSTO to space.

In addition, if the SSTO were designed to have a broad base for reentry, it would have a typical weight of 100,000 to 500,000 lbs. and would not fit inside conventional airplanes. This limitation would require a new plane with mammoth dimensions.

The literature also mentions some platforms propelled by jet engines. Some of these, however, only lift objects over hurdles.

One which does not is U.S. Pat. No. 3,285,175. The device in that patent has several jet engines arranged in a circle to lift a missile into the atmosphere before launching. This system is limited, though, by its use of jet engines. Jet engines run out of sufficient air to carry their own weight at altitudes of 5,000 to 6,000 meters, far below the minimum altitude required (20,000 meters) to launch a SSTO without a large atmospheric drag.

Another disadvantage of these systems is that some are not fully reusable because they cannot be recovered easily. Launch systems often return to earth unpowered, making it difficult to recover them.

Conventional spacecraft are also poorly designed for reuse. Few, if any, unmanned vehicles return to earth under their own power. Moreover, as explained above, the design of spacecraft capable of reentering the atmosphere greatly complicates the design of launch vehicles.

SUMMARY OF THE INVENTION

The present invention provides a reusable single-stage-to-orbit spacecraft and a reusable spacecraft launch platform. They are aided by a spacecraft launch assembly, and a method of launch and recovery which substantially obviates one or more of the problems of the conventional systems.

One advantage of this invention is a reusable launch platform with improved stability and vertical maneuverability while lifting a spacecraft through the atmosphere and then returning to a landing site.

An additional advantage of the present invention is a controlled descent for the launch platform.

A further advantage of the present invention is an improved spacecraft design to reduce the structural weight of the spacecraft.

An additional advantage of the present invention is improved lift-off and landing gear or support structures for a launch platform and for spacecraft.

Another advantage of the present invention is an improved support structure in spacecraft design which increases the structural strength of the base or bottom of a reusable SSTO spacecraft.

Still another advantage of the present invention is a reusable launch assist platform, a reusable single-stage-to-orbit spacecraft, and a launching and landing method which use only existing space and rocket engine materials and technology.

A further advantage of this invention is a resilient landing device to cushion the impact of a spacecraft returning to earth.

Additional features and advantages of the invention will be set forth in the description which follows and in part will be apparent from the description, or may be learned by practicing the invention. The advantages of the invention will be realized and attained by the apparatus, systems and method particularly pointed out in the following written description, drawings, and claims.

To achieve these and other advantages, and in accordance with the purpose of the invention, as embodied and broadly described, the invention uses a reusable launch assist platform to lift a reusable single-stage-to-orbit spacecraft through the atmosphere on a substantially vertical trajectory, and to place this single-stage-to-orbit spacecraft in a position suitable for launch from the platform. The single-stage-to-orbit spacecraft then separates from the launch platform and assumes an orbital or space-oriented trajectory. The launch platform returns to earth in a powered, substantially vertical descent trajectory to a predetermined landing site.

After the reusable spacecraft achieves its orbital or space mission, it too may reenter the atmosphere, slowing its descent after reentry by firing its rocket engine. The spacecraft lands base first in a specially-designed, resilient landing device.

Specifically, a reusable vehicle according to this invention for carrying a payload substantially through the atmosphere for release of the payload, comprises a frame including a support for the payload; propulsion means, coupled to the frame, for propelling the vehicle and the payload substantially vertically through the atmosphere, the propulsion means including a plurality of rocket engines; and guidance means for controlling the propulsion means during propulsion through the atmosphere and return of the vehicle after release of the payload.

A reusable, single-stage-to-orbit spacecraft according to this invention comprises an outer structure having a squat cone shape and a rounded base with a recessed well; a guidance system for controlling the spacecraft; and a rocket engine, controlled by the guidance system, and aligned with the well in the base, to provide propulsion and braking for the spacecraft.

A method of launching a spacecraft into space according to this invention comprises the steps of placing the spacecraft on a launch assist platform; propelling the platform and spacecraft aloft in a substantially vertical ascent trajectory substantially through the atmosphere using rocket engines; separating the spacecraft from the platform; propelling the spacecraft beyond the highest trajectory of the platform using a spacecraft rocket engine; and guiding the platform through a substantially vertical descent, slowed by the rocket engines, to achieve a soft landing at a predetermined landing site.

A resilient landing device according to another aspect of this invention allows a spacecraft to land gently and comprises shock absorbing means to absorb the impact of the spacecraft during descent and footing means for holding the shock absorbing means in the ground.

The following detailed description is both exemplary and provides further explanation of the claimed invention. The accompanying drawings also provide a further understanding of the invention and illustrate several embodiments of the invention. Together with the description, the drawings also explain the principles of the invention.

BRIEF DESCRIPTION OF THE DRAWINGS

FIG. 19 is a diagram of the platform and spacecraft of FIG. 1 on launchpad;

FIG. 20 is a diagram of the launchpad of FIG. 19 after lift-off.

DETAILED DESCRIPTION OF THE PREFERRED EMBODIMENTS

A. OVERVIEW

Figure 1:
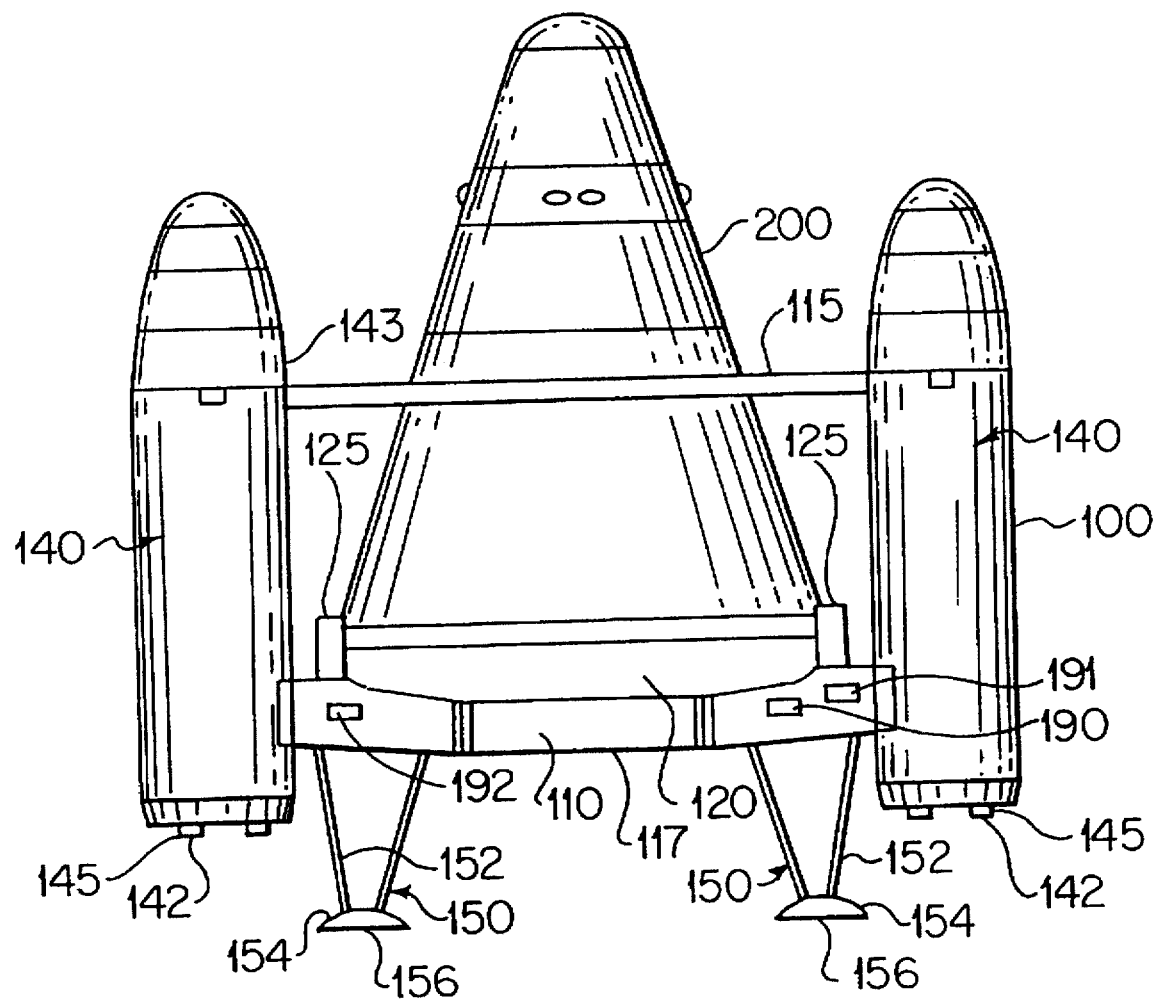
FIG. 1 is a diagram of a preferred embodiment of the launch assist platform and spacecraft of this invention ready for launch.

Reference will be made in detail to currently preferred embodiments of the invention, examples of which are illustrated in the accompanying drawings. Like reference numerals refer to like parts in the various figures of the drawings.

In the present invention, a launch assist platform, or LAP, propels a reusable SSTO spacecraft substantially through the atmosphere in a substantially vertical trajectory. When it reaches its apex, the LAP separates from the spacecraft, and the spacecraft proceeds along its predetermined path, such as into orbit around the earth or into deep space.

Although the LAP of this invention can be used at any altitude up to about 100,000 feet, or even higher depending on the size of the spacecraft being launched, the preferred altitude to launch the spacecraft from the LAP is 60,000 feet to 100,000 feet.

A spacecraft with a 100,000 lb. launch weight launched in this matter would arrive in orbit with a 50% larger orbital weight than it would using conventional techniques. This invention could thus increase the computed payload capacity from −2% (meaning the craft would not make it to orbit) to a +3% of the initial launch weight, based on a net spacecraft weight of 12%.

Figure 2:
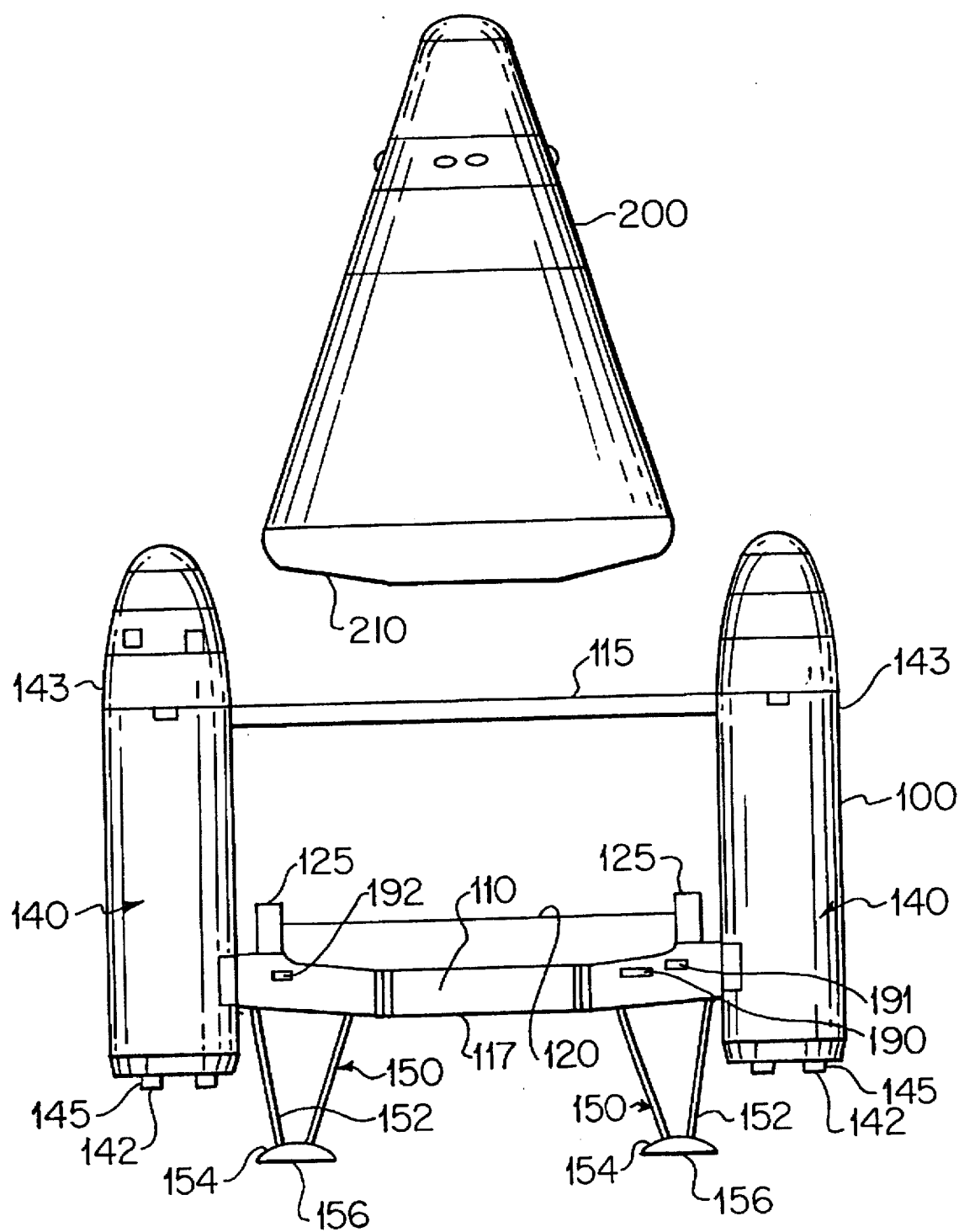
FIG. 2 is an exploded view of the platform and spacecraft of FIG. 1.

FIG. 1 shows a preferred embodiment of LAP 100 and spacecraft payload 200 integrated and ready for launch. FIG. 2 is an exploded view of spacecraft 200 and LAP 100, to show additional subsystems of both.

Figure 3:
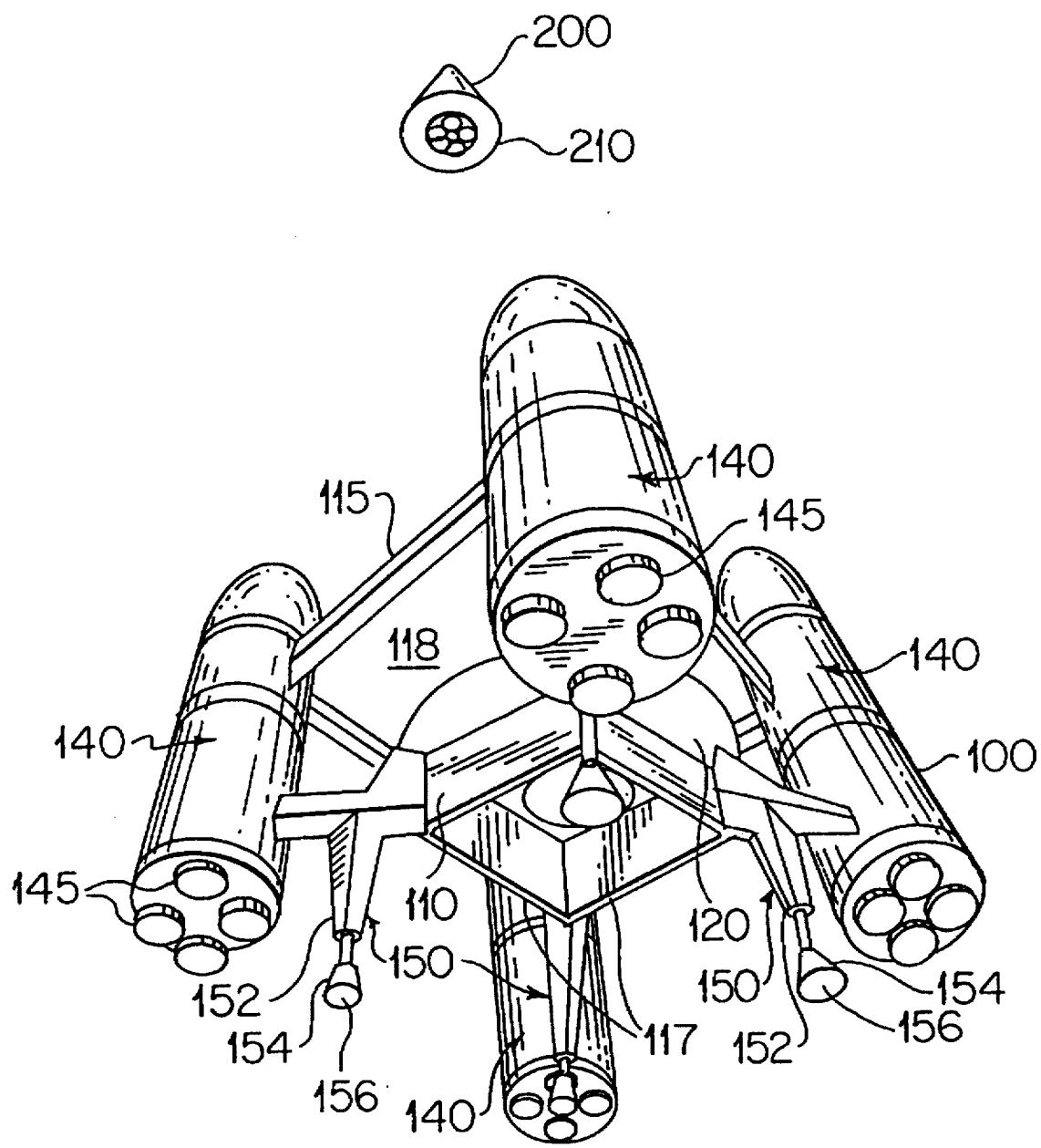
FIG. 3 is a perspective view of the platform and spacecraft of FIG. 1 after separation.
Figure 4:
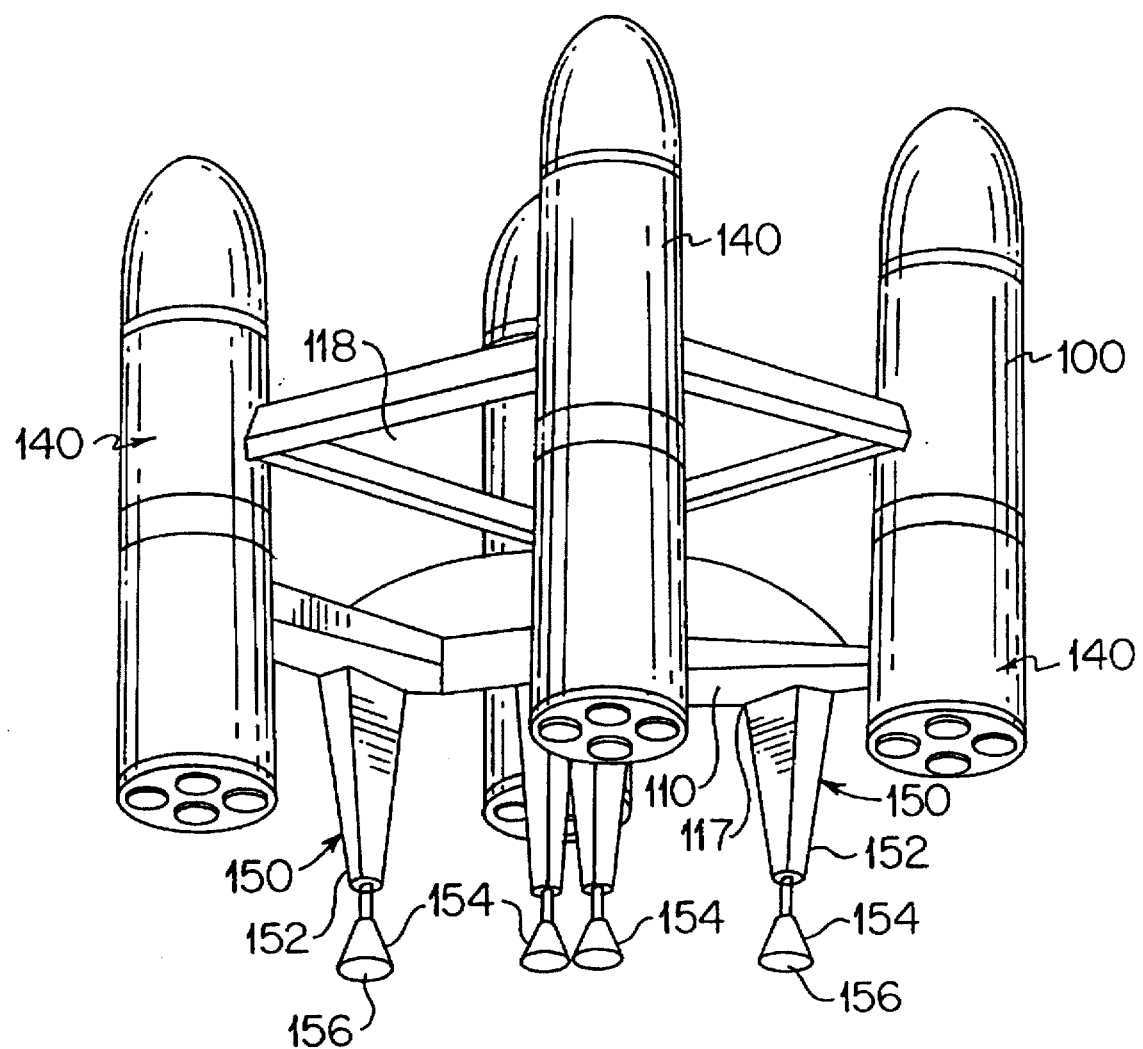
FIG. 4 is a perspective view of the platform of FIG. 1 during its descent after separation.

Spacecraft 200 preferably sits on LAP 100 in the same manner from launch until separation. After they separate, as FIG. 3 shows, LAP 100 and spacecraft 200 become two independently-powered vehicles. LAP 100 then returns to earth under its own power, again in a substantially vertical trajectory. To slow its descent and obtain the soft landing, LAP 100 preferably uses the same rocket engines it used during its ascent. FIG. 4 shows LAP 100 as it descends.

Spacecraft 200 also lands under its own power. To do so, the spacecraft uses a rocket engine to slow down its descent, and a resilient landing device cushions the final impact.

Because LAP 100 propels spacecraft 200 substantially through the atmosphere, spacecraft 200 need not carry fuel for the exhausting tasks of escaping gravity and fighting air resistance. Instead, spacecraft 200 need only carry the fuel needed for final atmospheric escape and its return to earth.

In addition, LAP 100 can return back to the earth in a controlled descent to a spot at or near the launch site for refurbishing and reuse. It is important that the descent be controlled to a predetermined site so that the LAP can be retrieved and transported quickly.

If the spacecraft is in an earth orbit and is to return, the spacecraft uses its remaining fuel to descend, bottom first, in a controlled manner. During descent, the spacecraft will use atmospheric braking as well as retrofiring of rocket engines to control its velocity and direction.

LAUNCH ASSIST PLATFORM

1. Structure

As FIGS. 1 and 2 show, LAP 100 includes frame 110 with cradle 120 to support spacecraft 200. Frame 110 provides the essential structural support for LAP 100, and cradle 120 structurally supports the base 210 of spacecraft 200 to minimize stress and shear forces. Preferably, frame 110 is made of lightweight metal, such as aluminum, titanium, aluminum alloys, or titanium alloys.

Frame 110 also supports rocket systems 140 and landing gear 150, including legs 152, and feet 154. Frame 110 may also include auxiliary struts 115 for additional rigidity. Preferably, auxiliary struts and the other portions of frame 110 are shaped aerodynamically to reduce drag during ascent and to impart drag during descent. Conventional flaps and other devices can also be used with LAP 100 for the same purposes.

The perspective views in FIGS. 3 and 4 show that frame 110 has an axial opening 118 situated between rocket systems 140. Opening 118 is sufficiently large to accommodate at least a portion of spacecraft 200 between rocket systems 140. In addition, frame 110 can also receive the bottom of base 210 of spacecraft 200 in opening 118.

Figure 5:
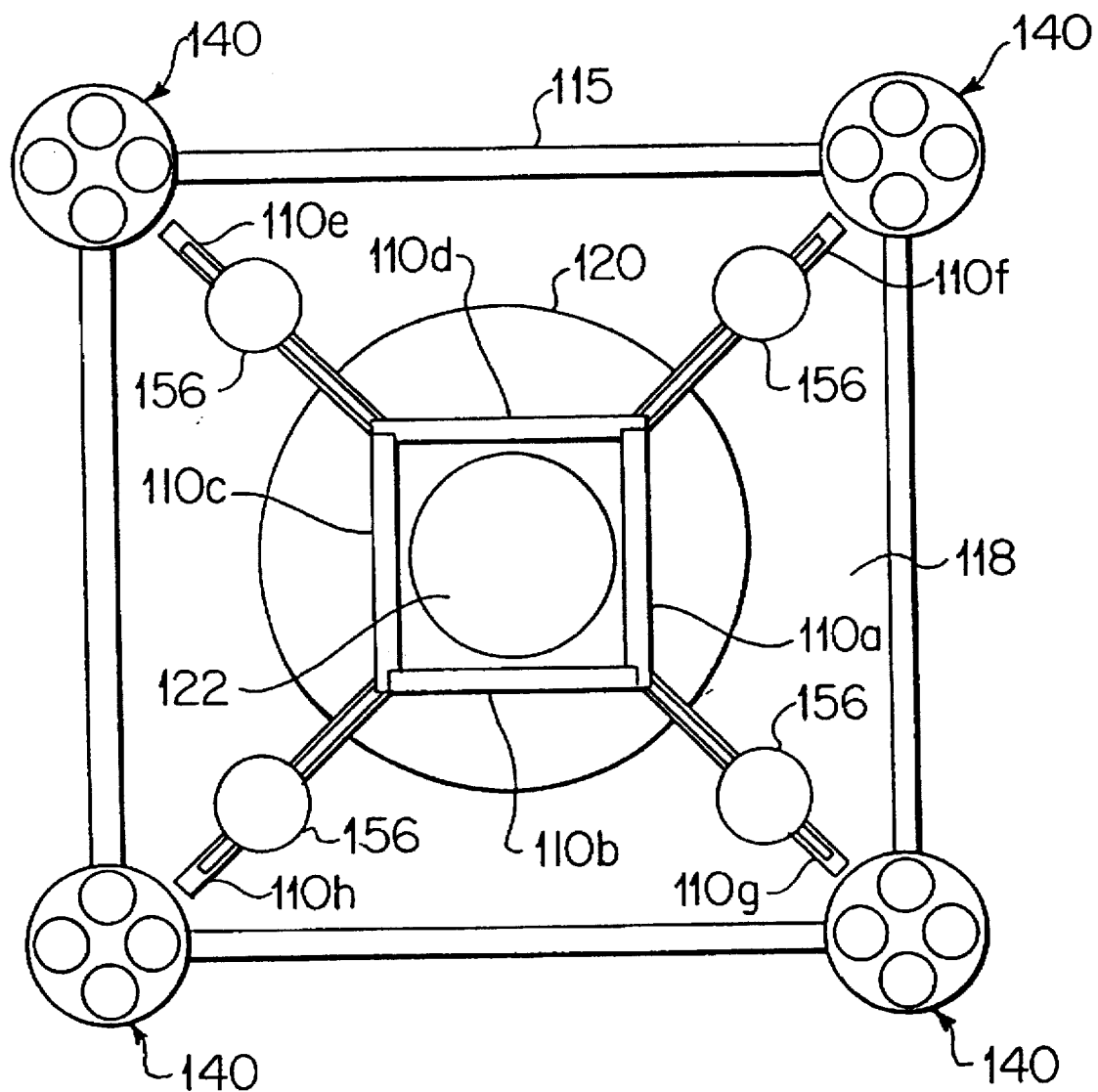
FIG. 5 is a view of the platform of FIG. 1 from below its frame.

FIG. 5 shows a view from below frame 110. Four members of frame 110 form a square, 110a, 110b, 110c, and 110d, and four radial arm members, 110e, 110f, 110g, and 110h, support rocket systems 140. These eight members collectively form a symmetrical, star-shaped structure. Preferably, all eight frame members support cradle 120 as well.

The reason for arranging frame members 110a, 110b, 110c, and 110d to form a central opening is to prevent frame 110 from interfering with exhaust from a propulsion unit of a spacecraft 200 during separation. Cradle 120 also has an opening 122 aligned with the central opening of frame 110 for the same purpose.

Cradle 120 preferably extends into axial opening 118 sufficiently to impart a measurable vertical drag on LAP 100 during descent. Cradle 120 also has an extended surface shaped to conform to the broad, rounded base 210 of spacecraft 200. The reason cradle 120 conforms to the shape of spacecraft base 210 is to provide a distributed weight support and stability during launch. If cradle 120 does not conform relatively closely to base 210, the spacecraft 200 would need to provide its own structural rigidity, and this would add weight.

Cradle 120 may be independent of frame 110 or an integral part of frame 110. When cradle 120 is an integral part of frame 110, cradle 120 is generally made of the same structural material as frame 110.

To stabilize spacecraft 200 on LAP 100 further during lift-off and ascent through the atmosphere, cradle 120 can include releasable latching devices. An example of these devices, latches 125, are shown in FIGS. 1 and 2. Latches 125 latch or tether the spacecraft 200 to cradle 120, and can also connect to frame 110. Latches 125 can be released by any conventional means, including the force generated by spacecraft 200 during separation. Latches 125 can also release mechanically.

LAP 100 also preferably has launch support surfaces 117 to support LAP 100, spacecraft 200, and a full load of fuel before and during launch. Although separate contact points may be connected to the bottom of frame 110 to act as launch support surfaces 117, it is preferable that launch support surfaces 117 be integral with the bottom of frame 110, and be adapted to mate with or perch on raised area or elevated portion of a launchpad.

Launch support surfaces 117 are preferably supported on a raised platform so that the lowermost end 142 of rocket systems 140 clear the launch pad, and legs 152 and feet 154 need not bear any substantial amount of structural weight before and during launch.

Legs 152 and feet 154 support LAP 100 after it returns from launch. At that point, LAP 100 is relatively light, having only its own weight and a residual amount of fuel. Thus, legs 152 and feet 154 need not be designed to support a significant amount of weight. Landing support surfaces 156 at the bottom of feet 154 extend below the lowermost extensions 142 to prevent damage upon landing.

Figure 1A:
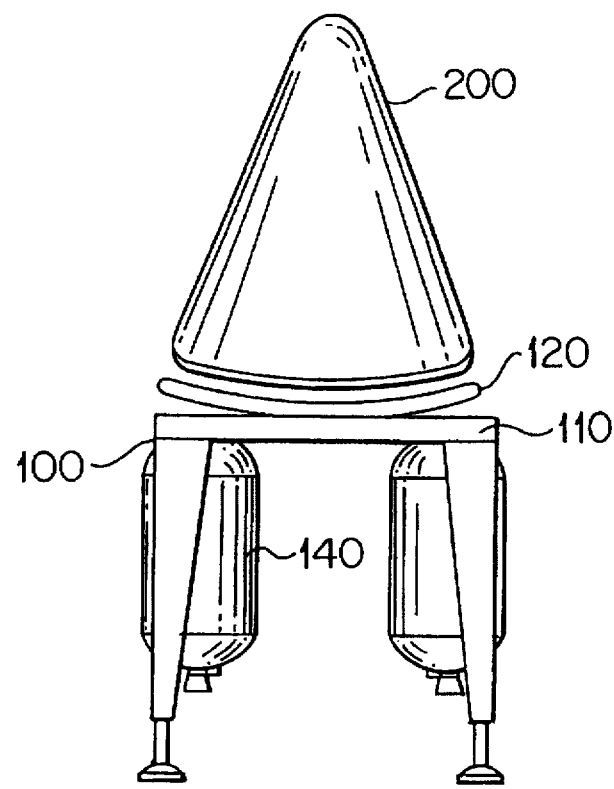
FIG. 1a is a diagram of an alternate embodiment of a launch assist platform.

FIG. 1a shows an alternate configuration for LAP 100. In FIG. 1a, rocket systems 140 are carried below frame 110 to reduce atmospheric drag on ascent. The lower drag, however, may be offset by lower stability and less compactness.

2. Propulsion

Frame 110 holds several rocket systems 140 for propelling LAP 100 and spacecraft 200. As FIG. 1 shows, frame 110 interconnects rocket systems 140 and holds them in a spaced-apart, vertical orientation. Although not always required, frame 110 may use auxiliary struts 115 to add stability to the rocket systems 140. Each auxiliary strut 115 connects two adjacent rocket systems 140 above the point where rocket systems 140 attach to frame 110.

Rocket systems 140 include rocket engines 145. The number and size of rocket engines 145 depend on several factors, such as the size and weight of LAP 100 and spacecraft 200 and the type of fuel used by rocket systems 140.

Rocket engines 145 can have a conventional design, for example, a LOX/kerosene rocket engines. In one embodiment of the present invention, rocket systems with four hydrogen peroxide bipropellant rocket engines provide 400,000 lb. of thrust, enough to lift LAP 100 and spacecraft 200 with a glow of 320,000 lbs.

Whatever the design, the number of rocket engines 145 chosen must provide a total thrust sufficient to propel LAP and spacecraft 200 vertically to the separation point in the upper atmosphere, and return to a predetermined landing site.

Examples of possible propellants for rocket engines 145 include oxygen and kerosene bipropellants, hydrogen peroxide and kerosene bipropellants, and liquid oxygen and liquid hydrogen bipropellants.

Tanks for the propellants of LAP 100 reside in rocket system 140 in tanks positioned in pod 143 (FIG. 1) vertically above rocket engines 145. Rocket engines 145 reside in the lower section of pod 143.

Figure 6:
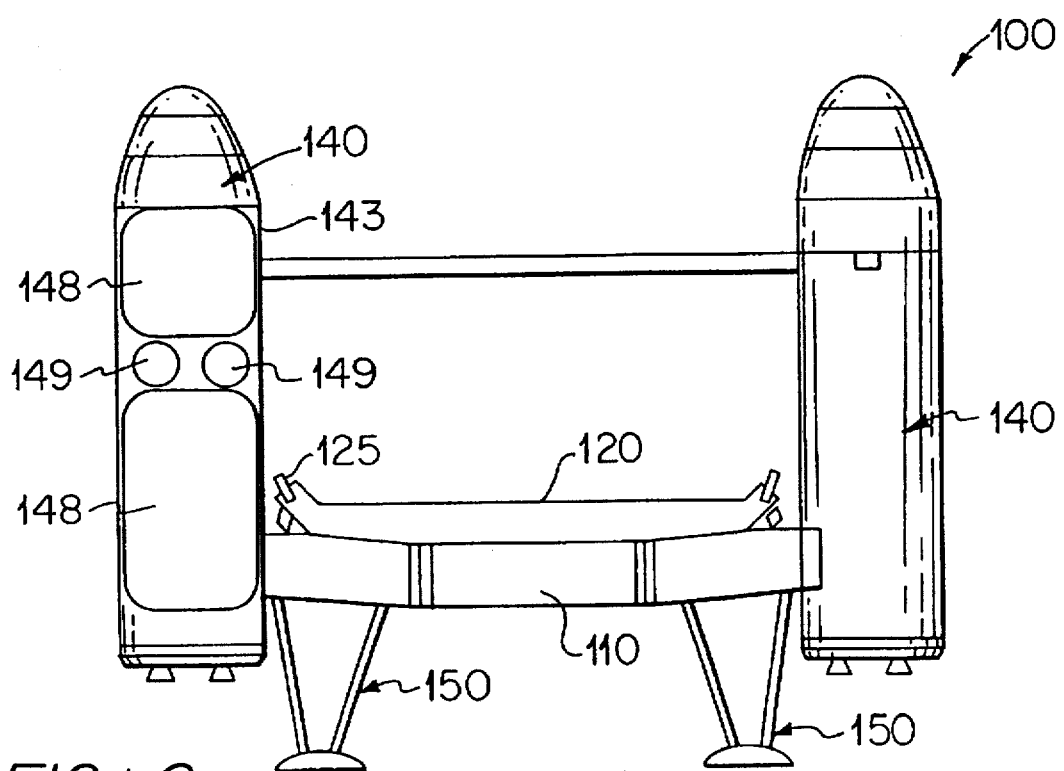
FIG. 6 is a view of the platform of FIG. 1 with a cutaway view of a rocket system.

In the cutaway view of rocket system 140 in FIG. 6, each rocket system 140 has fuel tanks 148 in pod 143. Typically there would be at least two such tanks, such as fuel and oxidizer tanks. Conventional conduits, pumps, metering devices, and valves (not shown) can be used to supply propellant from propellant tanks in containment system 148 to rocket engines 145. Spherical helium tanks 149 are used to force the fuel out of tanks 148.

Figure 7:
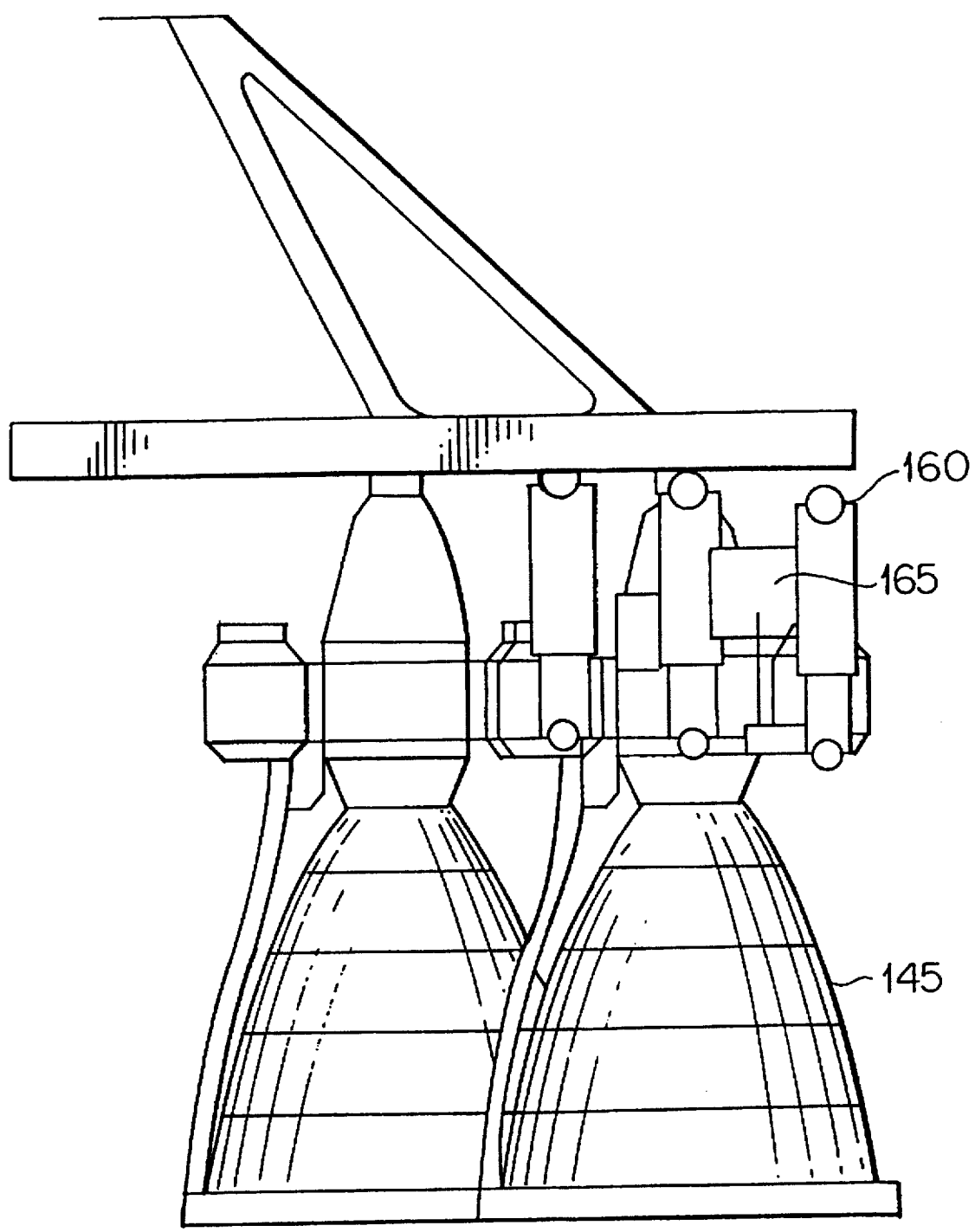
FIG. 7 is a diagram of a gimballing arrangement for a rocket engine used with the platform of FIG. 1.

To maneuver LAP 100, rocket engines 145 or the nozzles of rocket engines 145 may be gimballed at the point of attachment using conventional gimballing devices shown in FIG. 7. As FIG. 7 shows, rocket engines 4 connect to center structural supports 160. The gimballing mechanisms include gimbal actuators 165.

LAP 100 generally does not have any useful horizontal speed beyond that necessary during descent to return LAP 100 to a predetermined landing site. For this purpose, some type of propulsion, for example, from attitude control engines or lateral thrust engines, can be easily installed to provide horizontal movement. In the preferred embodiments of the present invention, any necessary horizontal movement during descent will be provided by gimbals and rocket system 140.

While there is no particular limitation to the velocity at which LAP 100 ascends, the initial velocity of LAP 100 is subsonic, and later speeds reach supersonic levels, for example, up to about Mach 1.0 to about Mach 1.5. Naturally, the descent of the platform to a landing site is at subsonic speeds.

3. Avionics

The structure and the propulsion systems alone do not allow LAP 100 to achieve all of its objectives. LAP 100 must also include avionics to ensure proper attitude control and timing during launch and reentry. Thus, the avionics must be able to control rocket systems 140 to communicate with a ground station or spacecraft 200, and to generate navigational signals.

FIGS. 1 and 2 illustrate the avionics on LAP 100 to control its functions. The avionics system consists of fairly conventional electronics programmed for the specific needs of LAP 100. For example, the avionics system would include a central processor 190 a guidance and navigation system 192, with a global positioning apparatus, and a communications system 191. From commands received either from the communication system 191 or from a stored program, central processor 190 gathers information from the guidance and navigation system 192 to control the trajectory of spacecraft 200. The avionics system could also control safety systems or perform similar tasks.

In addition, the avionics system could communicate with a data processing system 260 on spacecraft 200 to coordinate separation and, if desired, to communicate spacecraft signals to a ground station. Of course, spacecraft 200 could communicate directly with the ground station.

C. SPACECRAFT

1. Structure

Figure 8:
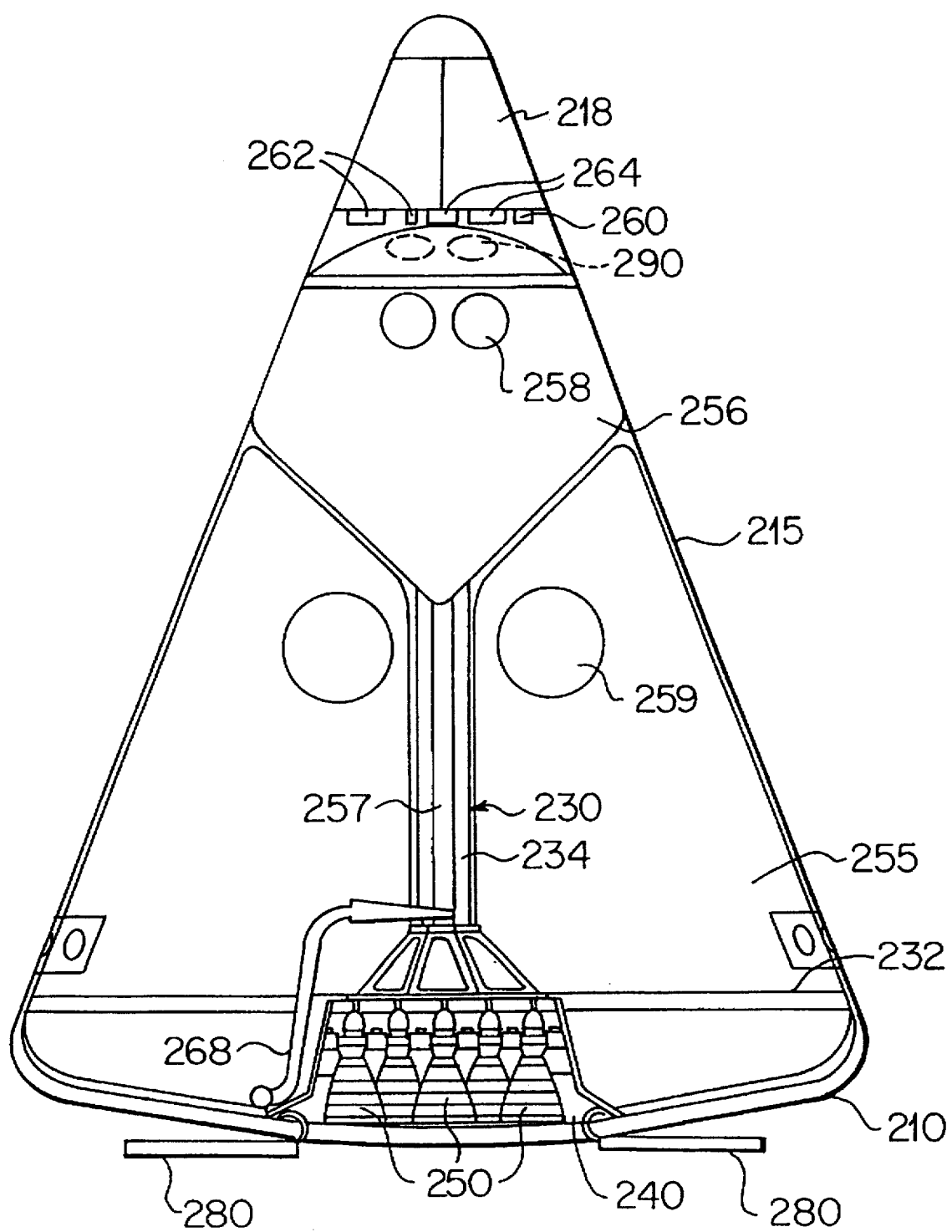
FIG. 8 is a cutaway view of one embodiment of the spacecraft of FIG. 1.
Figure 9:
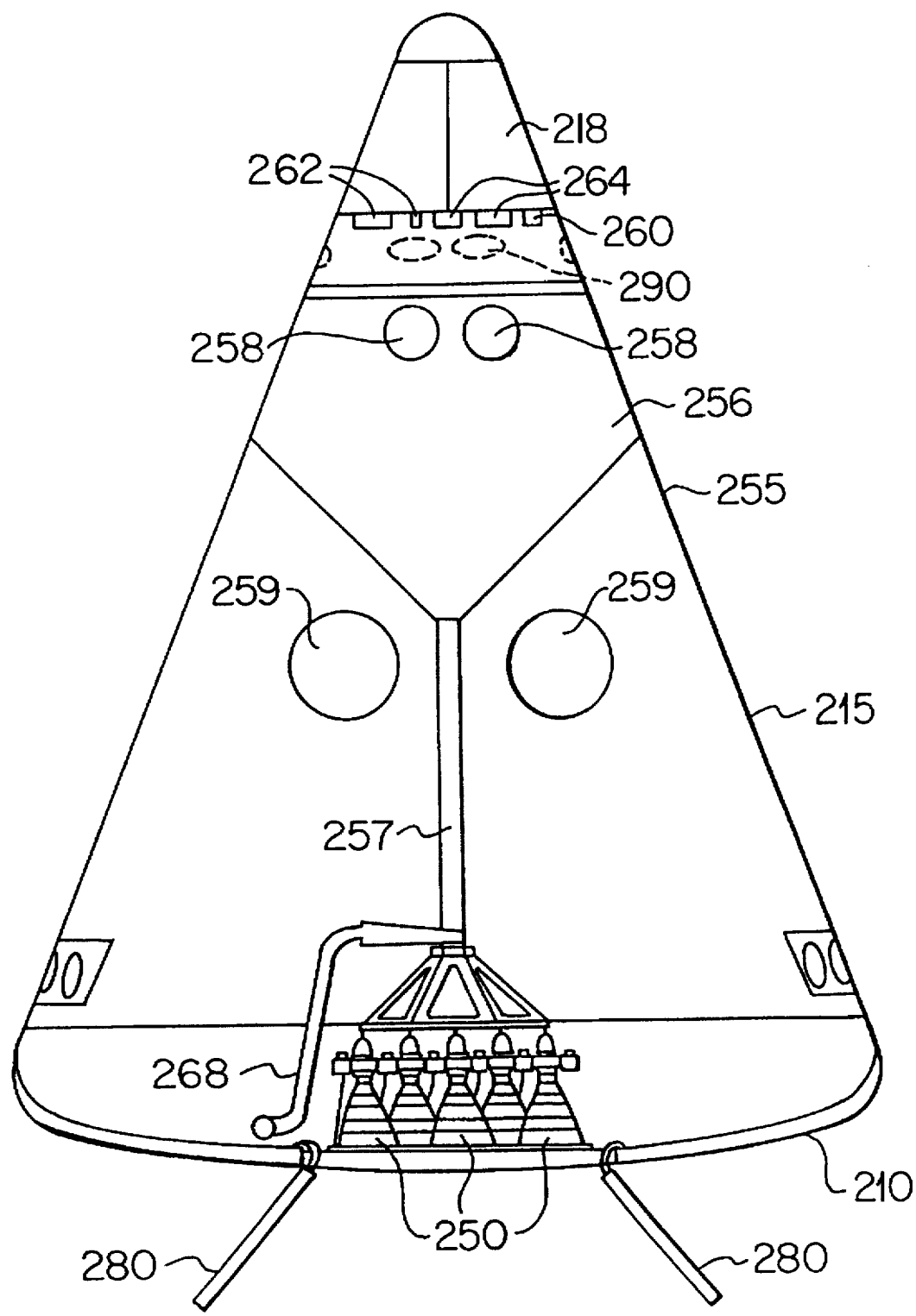
FIG. 9 is a different cutaway view of the spacecraft shown in FIG. 8.
Figure 10:
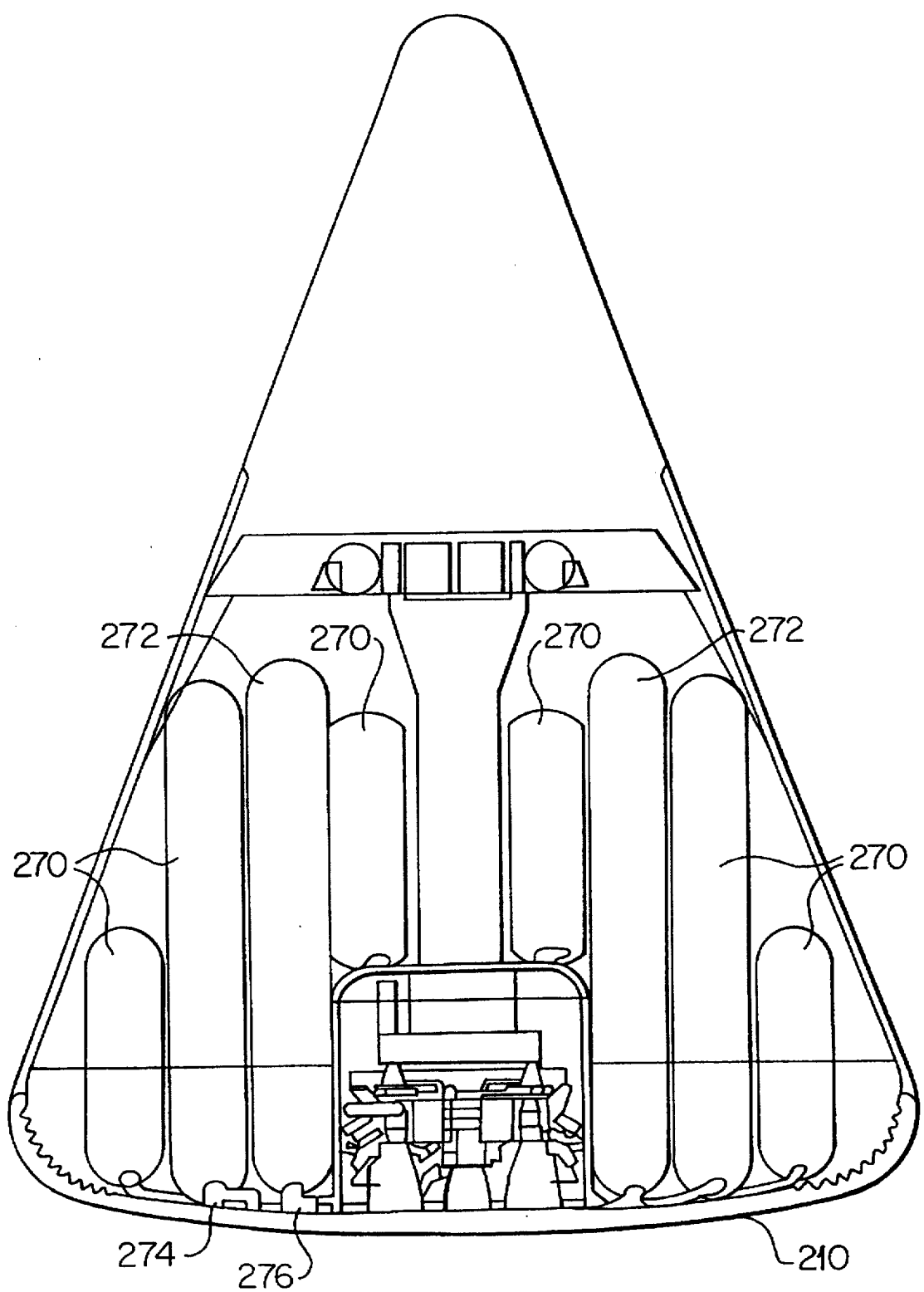
FIG. 10 is a cutaway view of an alternate embodiment of the spacecraft of FIG. 1.

Reusable SSTO spacecraft 200 is shown in greater detail in FIGS. 8-10. FIGS. 8 and 9 show details of one embodiment of spacecraft 200, and FIG. 9 shows an alternate embodiment with a different fuel tank arrangement. Spacecraft 200 has an outer skin 215 in the shape of a squat cone. At the bottom of spacecraft 200, skin 215 connects cone with circular, rounded base 210. The top of spacecraft 200 is a spacecraft nose 218, which could house some type of spacecraft payload.

The dimensions of spacecraft 200 can vary, but two design constraints should be kept in mind. First, the preferred ratio of height to base diameter is less than 2. Second, the shape should provide a lift-to-drag ratio greater than about 0.2 at reentry.

As FIG. 8 shows, an inner, primary load-bearing structure 230 lies substantially perpendicular to and sits on base 210. Structure 230 contains a hollow tubular element 234 and can include several radial ribs 232 integrally connected with base 210. If, however, tank 255 is a single compartment, then there would be no ribs 232. Tubular element 234 and radial ribs 232 are preferably made from lightweight metals such as aluminum or titanium.

Instead of structure 230, the primary load-bearing structure could be a vertical truss centrally located in spacecraft 200. Such a truss may have radial ribs connected to base 210.

The bottom portion of load bearing structure 230 is chamber 240 which opens into base 210. Chamber 240 is sufficiently large to accommodate the propulsion system of spacecraft 200.

Skin 215 may also act as a secondary load-bearing structure. Skin 215 is preferably made from lightweight materials, such as carbon fiber composites, aluminum, or titanium.

Although structure 230 provides sufficient strength to base 210 to support launch load and landing shock, skin 215 can also act as the primary load-bearing structure if it is properly designed to support launch load and landing shock. The preferred embodiment of the present invention, however, uses structure 230.

Base 210 has two principal functions. First, base 210 supports the weight of spacecraft 200 during launching and landing. For this reason, base 210 must be structurally sound.

Second, base 210 must withstand tremendous heat during reentry. Spacecraft 200 enters the atmosphere base first, so base 210 receives much of the thermal load. Therefore, base 210 must have a thermal protection system to protect spacecraft 200 from the intense heat. Although many different types of thermal protection are possible, the preferred embodiment uses a thermally insulative coating on base 210, such as silicon carbide applied to the base as fibers.

2. Propulsion

Propulsion for spacecraft 200 is provided by rocket engines 250, controlled by data processing system 260, provide propulsion and braking for the spacecraft. The same type of engines used in LAP 100 may also be used in spacecraft 200. The preferred embodiments of rocket engines 250 use liquid hydrogen and liquid oxygen as propellants.

Figure 11:
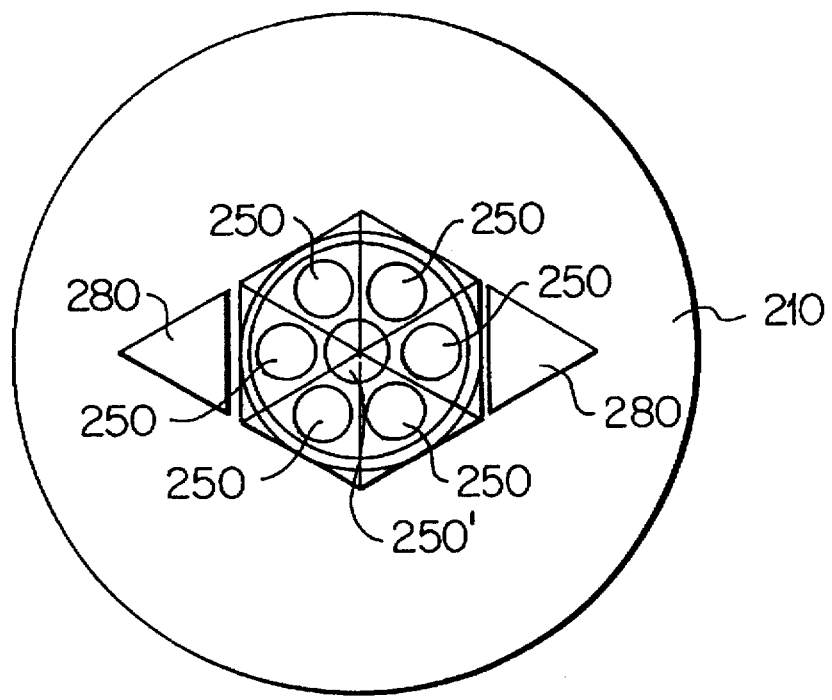
FIG. 11 is a view from below the spacecraft of FIG. 1 showing panels to seal the spacecraft base.

In the preferred embodiment, several rocket engines 250 are centrally located adjacent base 210 and organized into a cluster. FIG. 11, which is a bottom view of spacecraft 200, shows six peripheral rocket engines 250 surrounding one central rocket engine 250'. The central rocket engine is preferably a sea-level operational engine with a small exhaust nozzle. The six outer rocket engines are vacuum-operational for space propulsion and have larger exhaust nozzles.

Propellant tanks may be located throughout the spacecraft. If the rocket engines use a bipropellant, e.g., a fuel and an oxidizer, there must of course be at least one fuel tank and at least one oxidizer tank. FIGS. 8 and 9 show a propellant tank 255 located adjacent base 210 and surrounding primary load-bearing structure 230. Those figures also show an oxidizer tank 256 located above and adjacent propellant tank 255. Propellant line 257 provides fuel from propellant tank 256 to rocket engines 250, and propellant line 268 provides fuel from tank 255 to rocket engine 250.

Propellant tanks 258 and 259 are reserve tanks for reentry. They provide fuel for rocket engine 250', and are used to keep the fuel in a proper state.

The construction of propellant tank 255 or oxidizer tank 256 should accommodate the loads and other conditions experienced during launch and mission. A preferred construction for the tanks is a filament-wound tank made of lightweight composite materials.

The alternate embodiment in FIG. 10 shows the two large tanks replaced by several smaller, elongated fuel tanks 270 and 272 positioned substantially perpendicular to base 210. Elongated tanks 270 may contain liquid hydrogen fuel, and elongated tanks 272 may be contain oxygen. Each elongated fuel tank has its own independent feed line 274, 276 which can be independently controlled by data processing system 260 to maintain balance and fuel distribution within spacecraft 200.

Tanks 270, 272 can be adapted to almost any area within the spacecraft by changing their dimensions. Preferably, they have a diameter of about 12 inches and are about 6 to 30 feet long. The elongated cylindrical tanks are preferably made from aluminum, but they may also be made from other materials like carbon composites.

It may appear that rocket engines 250 would be exposed to an intense heat on reentry, possibly harming rocket engines 250 as well as spacecraft 200. To avoid this, the outer rims of the exhaust nozzles of rocket engines 250 are tightly sealed to base 210 to prevent hot plasma gases from penetrating into spacecraft 200.

Figure 12:
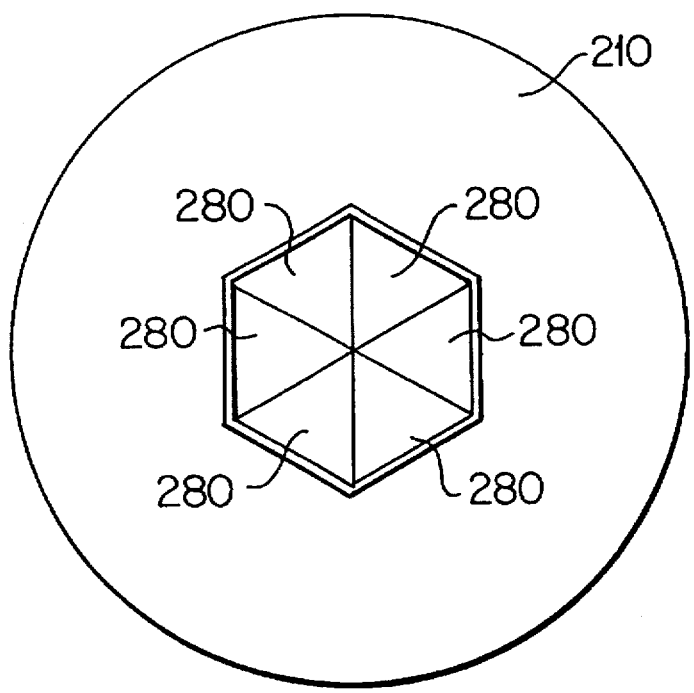
FIG. 12 is a view of the panels in FIG. 11 fully closed.

In addition, panels 280, shown in FIGS. 11 and 12, seal chamber 240 at base 210. In FIG. 11, two panels are open, and in FIG. 12, all panels are completely shut. FIGS. 11 and 12 show panels 280 as hinged to base 210. They can also be slidably mounted within base 210. In addition, nozzles of rocket engines 250 and 250' are slightly recessed so panels 280 can be shaped to seal chamber 240.

FIGS. 11 and 12 shows each panel 280 as triangular and hinged. Six panels 280 seal chamber 240. The doors are preferably made of the same material as base 210 to protect chamber 240 from the high heat of reentry.

In addition, conventional systems may be used to cool rocket engines 250 and 250' and their nozzles. Such systems include nozzle cooling tubes and tubes to bleed the propellant or oxidizer through the cooling tubes into the nozzle or combustion chamber.

Figure 13:
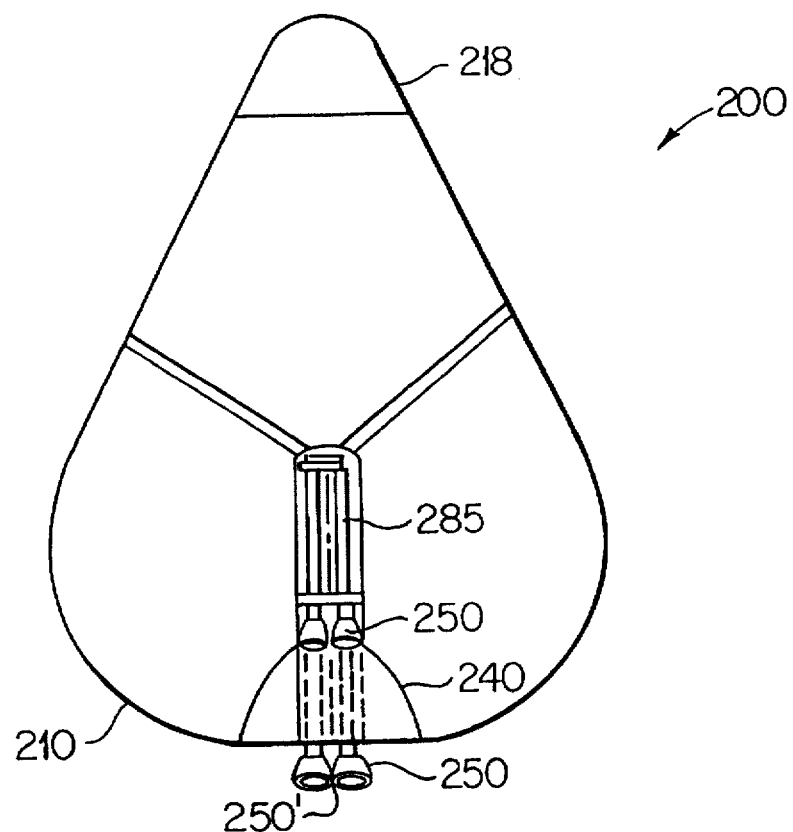
FIG. 13 is a view of another embodiment of the spacecraft of FIG. 1 showing retractable rocket engines.

In another aspect of the present invention, rocket engines 250 and 250' may be extendable and retractable to provide various advantages during flight and reentry. FIG. 13 shows rocket engines 250 and 250' retracted and extended. Rocket engines 250 and 250' are mounted on at least one extendable rack 285 movably mounted in chamber 240. The rocket engines move into and out of the interior of structure 230 through an opening in base 210.

Panels 280 may also be used with the extendable and retractable engines. Panels 280 would be closed to seal rocket engines 250 and 250' from the heat of reentry when rack 285 is retracted. Panels 280 are open when rocket engines 250 and 250' are extended and firing.

The rocket engines described are used principally for attaining the desired orbit and for reentry, although they could assist LAP 100 on ascent. In addition, attitude control thrusters 290, shown in FIGS. 2 and 13, may be used to guide spacecraft 200 in space.

3. Avionics

Spacecraft 200 preferably has a conventional avionics system for guidance and control. During flight, the avionics system controls the flow of propellants to peripheral rocket engines 250. During landing, the avionics system controls the central rocket engine 250'.

The avionics system preferably includes data processing system 260, communications system 262, and a guidance and navigation system 264. Guidance is crucial not only for the mission, but also for landing because spacecraft 200 is designed to land precisely on a landing device.

D. LANDING DEVICE

After spacecraft 200 has completed its mission and returned through the atmosphere, spacecraft 200 lands in a vertical orientation, base first, on a resilient landing device. The resilient landing device allows spacecraft 200 to land without damage that would prevent reuse.

Figure 14:
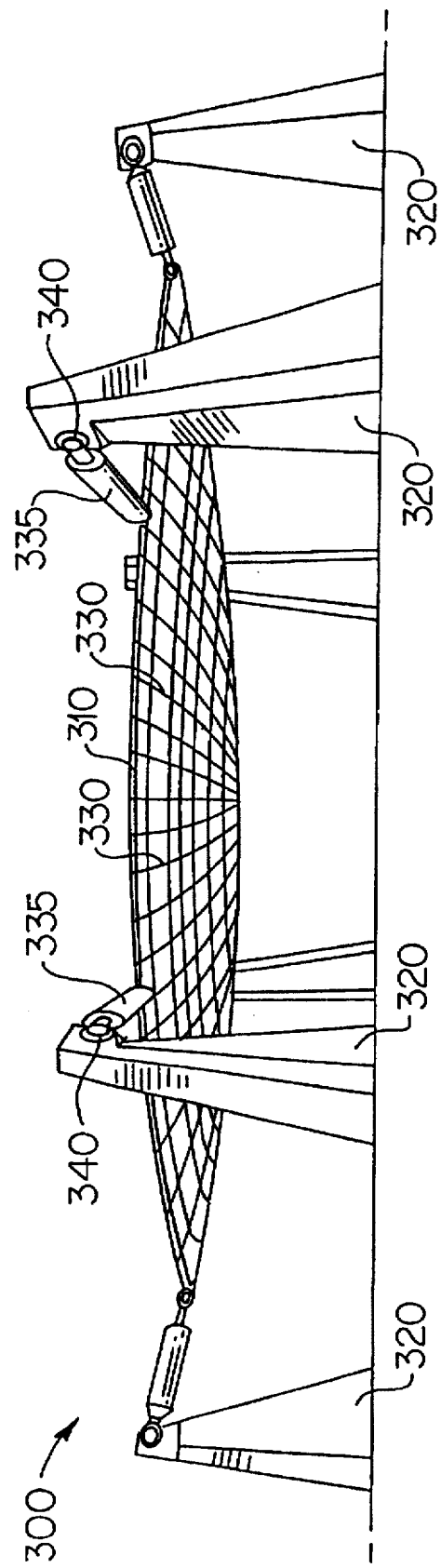
FIG. 14 is a diagram of a resilient landing device according to this invention.

Resilient landing device 300, illustrated in FIG. 14, includes a net 310 to absorb the landing impact of spacecraft 200. Footers 320 hold net 310 and are built into the ground. Net 310 includes a horizontal grid of intersecting cables 330 maintained under sufficient tension to support spacecraft 200 and absorbs the shock of landing. Cables 330 are fastened to tension control members 335, and tension control members 335 are anchored to footers 320 via a rigid support member 340. An example of a tension support member 335 is an outrigger tensioning system.

Figure 15:
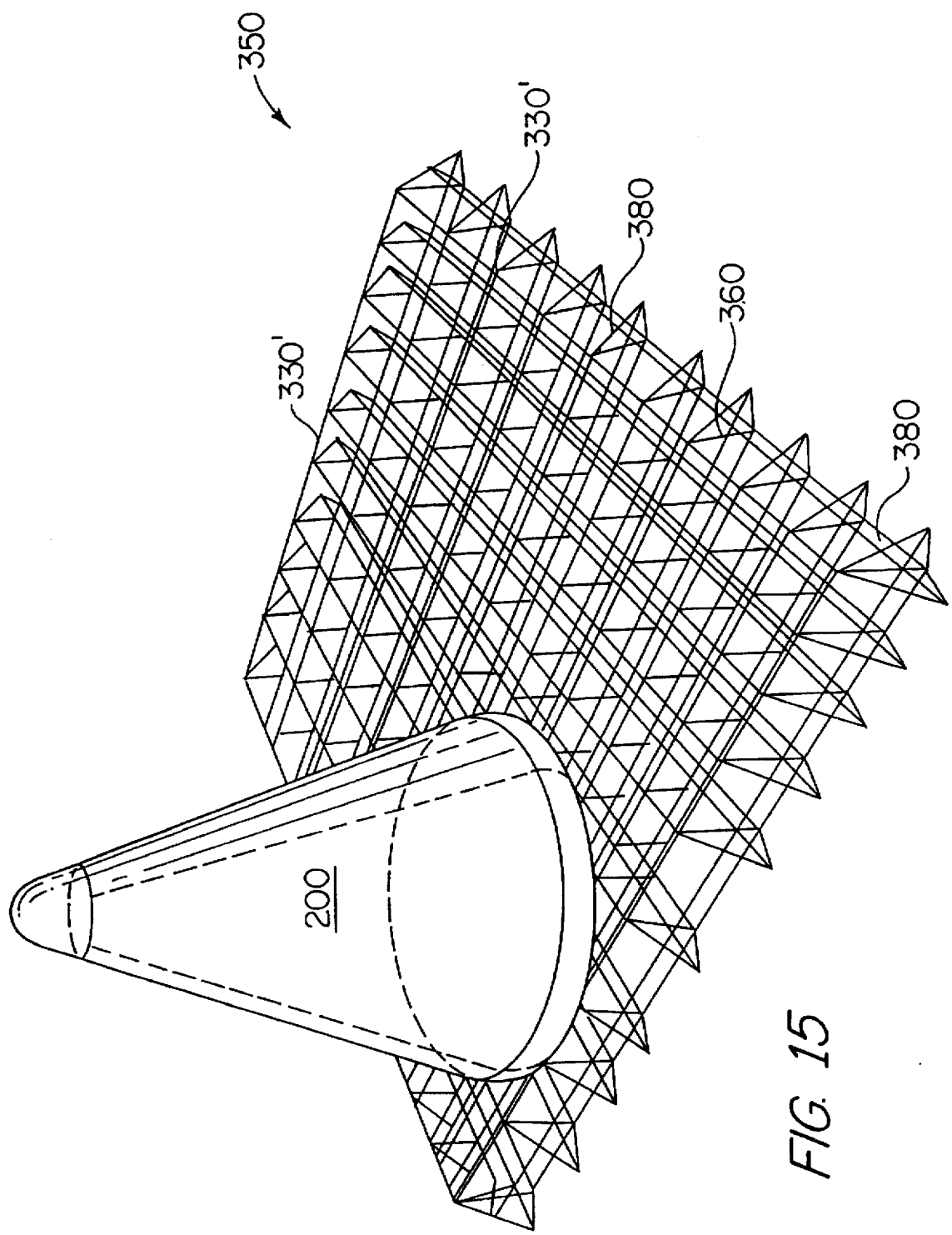
FIG. 15 is a diagram of an alternate resilient landing device according to this invention.

FIG. 15 shows an alternate landing device as a mattress 350 of intersecting cables 330'. Cables 330' should be spaced apart a distance that allows them to receive spacecraft 200. For example, in preferred embodiments, the cables may intersect every 6 inches to about every 36 inches.

A compressible member, such as spring encased shock absorber 360, lies under some of the cable intersections. Shock absorber 360 may be a gas absorber or a spring-loaded absorber. The preferred material for absorbers 360 and cables 330 is stainless steel.

Figure 16:
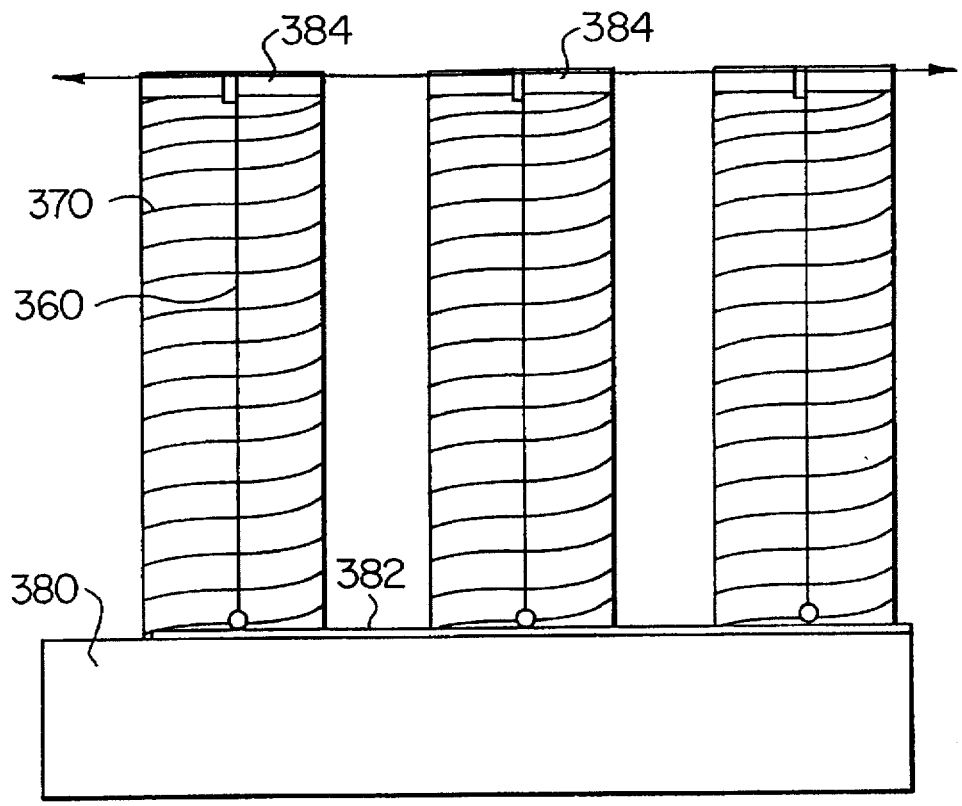
FIG. 16 is a diagram of a shock absorber in a unloaded position used with the landing device of FIG. 15.
Figure 17:
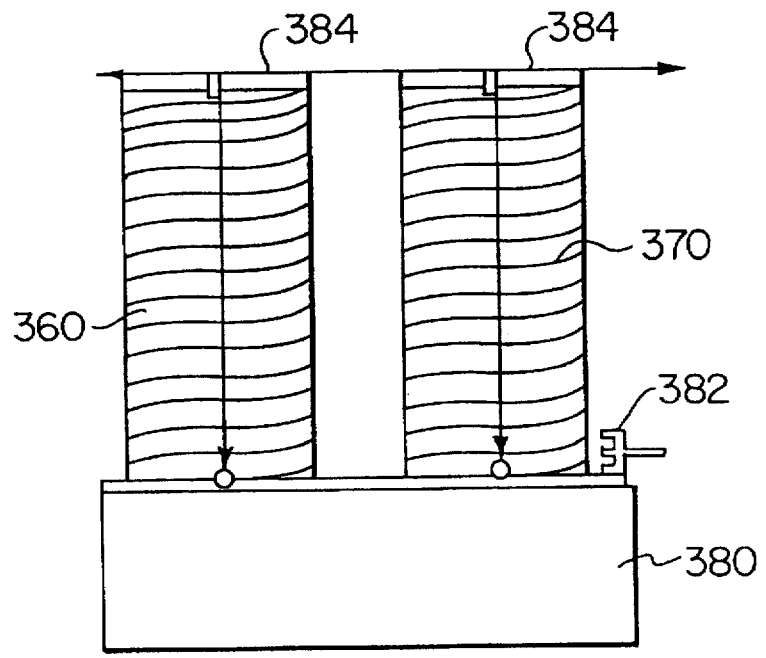
FIG. 17 is a diagram of a shock absorber in a preloaded position used with the landing device of FIG. 15.

FIGS. 16 and 17 show shock absorbers 360 in greater detail. FIG. 16 illustrates a spring-loaded absorber 360 in the unloaded or relaxed state. FIG. 17 shows spring-loaded absorber 360 in the preloaded state.

Absorber 360 is mounted to support member 380, such as a concrete base or an I-beam. Support member 380 may also be set at skids to make the device movable.

In shock absorber 360, a stainless steel coil spring 370 surrounds a tension member secured at one end to plate 382, which is in turn attached to support member 380. The other end of shock absorber 360 is a disk 384 connected to the top of spring 370. Preferably, spring 370 is biased to preload shock absorber 360.

Figure 18:
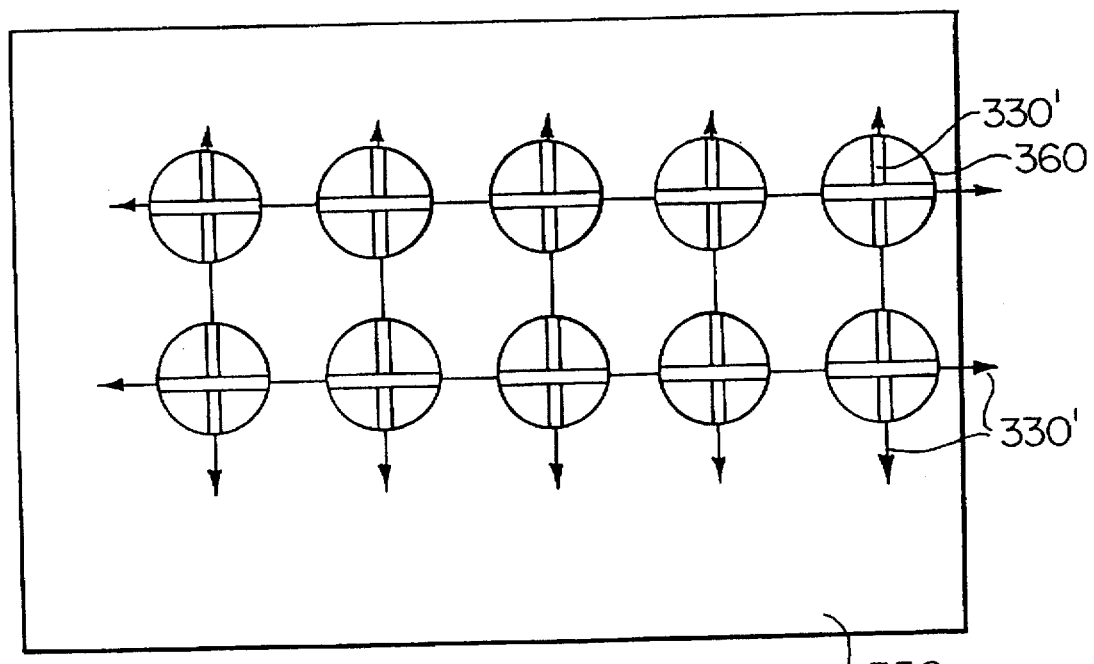
FIG. 18 is a top down view of a portion of the landing device of FIG. 15.

FIG. 18 illustrates a top plan view of shock absorbers 360 used in the landing device 330' of FIG. 15. The arrows show how tension is applied to cable 330' to compress the stainless steel spring.

E. LAUNCHPAD

FIGS. 19 and 20 illustrate a launchpad 400 to support the weight of LAP 100, spacecraft 200, and a full load of fuel for launch. Launchpad 400 is generally built directly on the ground or a suitable slab.

Launchpad 400 preferably includes several vertical members 410 each having an upper surface 420 contacting or mating with launch support surfaces 117 of LAP 100. When support surfaces 117 engage the upper surfaces 420 of members 410, lowermost portions 142 of rocket systems 140 clear launch pad 400.

Launchpad base 435 preferably holds launchpad 400. Ports 430, 432 accommodate exhaust from the rocket engines 145. Exhaust gas enters ports 430 and leaves through port 432.

V. CONCLUSION

The present invention obtains its advantages because of its unique design. The launch assist platform allows a spacecraft design that does not need to provide for fuel or rockets to reach space. In addition, the platform is reusable because it has a controlled descent to earth.

The spacecraft is reusable as well. Its descent is controlled to ensure that it lands on a resilient landing device. This ensures that the spacecraft suffers little damage and can easily be refurbished for reuse.

The spacecraft of this invention, while initially shown as unmanned, could eventually be adapted to carry humans as well. In addition, the system can accommodate many different types of spacecraft of many different sizes.

It will be apparent to those skilled in the art that various modifications and variations can be made in the spacecraft, launch assist platform, and landing device of the present invention without departing from the spirit or scope of the invention. The present invention covers modifications and variations that come within the scope of the appended claims and their equivalents.

What is claimed is:

1. A reusable spacecraft system comprising:
   a reusable spacecraft having a rounded base, a rocket engine in said base, and a system to control said engine to provide a vertical, base-first landing; and a landing platform which includes
   an open grid of intersecting cables and
   a support structure, said support structure including footings located at the periphery of said grid wherein said footing are resiliently connected to hold said grid horizontally above the ground under the impact of said spacecraft into said grid.

2. A system in accordance with claim 1, wherein said support structure includes a plurality of shock absorbers interposed between said footings and said periphery of said grid.

3. A system in accordance with claim 1, wherein said support structure includes a plurality of shock absorbers located between said intersecting cables and said ground to provide resilient support to said grid upon impact of said spacecraft into said grid.

* * * * *

UNITED STATES PATENT AND TRADEMARK OFFICE
CERTIFICATE OF CORRECTION

PATENT NO. : 5,667,167
DATED : September 16, 1997
INVENTOR(S) : Walter Paul Kistler It is certified that error appears in the above-indentified patent and that said Letters Patent is hereby corrected as shown below:

Claim 1, column 12, line 32, change "footing" to read --footings--.

Signed and Sealed this

Twenty-fifth Day of November, 1997

Attest:

BRUCE LEHMAN

Attesting Officer

Commissioner of Patents and Trademarks